United States Patent
Green et al.

(10) Patent No.: US 11,493,927 B2
(45) Date of Patent: Nov. 8, 2022

(54) SELF LEARNING VEHICLE CONTROL SYSTEM

(71) Applicant: THALES CANADA INC, Toronto (CA)

(72) Inventors: Alon Green, Toronto (CA); Dennis Yazhemsky, Toronto (CA)

(73) Assignee: THALES CANADA, INC., Toronto (CA)

( * ) Notice: Subject to any disclaimer, the term of this patent is extended or adjusted under 35 U.S.C. 154(b) by 267 days.

(21) Appl. No.: 16/430,207

(22) Filed: Jun. 3, 2019

(65) Prior Publication Data
US 2019/0369627 A1    Dec. 5, 2019

Related U.S. Application Data (60) Provisional application No. 62/679,475, filed on Jun. 1, 2018.

(51) Int. Cl.
*G05D 1/02*    (2020.01)
*B60W 30/14*   (2006.01)
*B60W 50/10*   (2012.01)

(52) U.S. Cl.
CPC ......... *G05D 1/0221* (2013.01); *B60W 30/146* (2013.01); *B60W 50/10* (2013.01);
(Continued)

(58) Field of Classification Search
CPC ......... G05D 2201/0213; G05D 1/0221; G05D 1/00; G05D 1/0044; G05D 1/02;
(Continued)

(56) References Cited

U.S. PATENT DOCUMENTS 5,904,215 A * 5/1999 Ikeda ............... B60T 8/174
                                                180/169
7,177,743 B2   2/2007 Roy
(Continued)

FOREIGN PATENT DOCUMENTS

EP    1302356 A1    4/2003
EP    3802252 A0    4/2021
(Continued)

OTHER PUBLICATIONS

Martin, Scott, "AI Think I Can: Why GPUs Could Be the Engine Leading US to Autonomous Trains", NVIDIA, Retrieved at https://blogs.nvidia.com/blog/2018/08/15/autonomous-trains-deep-learning-dgx-drive/.
(Continued)

*Primary Examiner* — Anthony R Jimenez
(74) *Attorney, Agent, or Firm* — Hauptman Ham, LLP (57) ABSTRACT

A self-learning vehicle control system, the control system including: a controller configured to receive one or more of the following inputs: actual propulsion effort command; actual braking effort command; requested speed command; change in the requested speed command; change in the requested acceleration command; measured vehicle location; measured vehicle 3-D speed; measured vehicle 3-D acceleration; and measured vehicle 3-D angular speed; and one or more position determination sensors communicably connected with the controller; one or more 3-D speed determination sensors communicably connected with the controller; one or more 3-D acceleration determination sensors communicably connected with the controller; one or more 3-D angular speed determination sensors communicably connected with the controller; and an output device communicably connected with the controller and for providing requested speed and acceleration commands.

20 Claims, 4 Drawing Sheets

(52) U.S. Cl.
CPC ... *B60W 2520/105* (2013.01); *B60W 2540/10* (2013.01); *B60W 2540/12* (2013.01); *G05D 2201/0213* (2013.01)

(58) Field of Classification Search
CPC .... G05D 1/021; G05D 1/0212; G05D 1/0214; G05D 1/0223; G05D 1/0231; G05D 1/0246; G05D 1/0253; G05D 1/0257; G05D 1/0278; G05D 1/0088; G05D 1/024; G05D 3/00; B60W 30/146; B60W 50/10; B60W 2520/105; B60W 2540/10; B60W 2540/12; B60W 2420/52; B60W 2555/60; B60W 10/18; B60W 10/20; G06N 3/0454; G06N 3/08; G05B 2219/25255; G05B 2219/40494; G05B 2219/41054; G05B 23/00; G05B 23/024; G05B 23/0254; G05B 23/0281; G05B 13/00; G05B 13/0265; G05B 13/027; G05B 13/029; G05B 13/04; G05B 13/048
USPC .......................................................... 701/23
See application file for complete search history.

(56) References Cited

U.S. PATENT DOCUMENTS

| | | | |
|---|---|---|---|
| 7,593,796 | B2 * | 9/2009 | Prokhorov ............ F02D 41/009 701/29.1 |
| 8,718,852 | B2 | 5/2014 | Weng et al. |
| 10,032,111 | B1 | 7/2018 | Bertram et al. |
| 2003/0093209 | A1 * | 5/2003 | Andersson ......... B60K 31/0058 701/93 |
| 2016/0016663 | A1 | 1/2016 | Stanek et al. |
| 2018/0164810 | A1 | 6/2018 | Luo et al. |
| 2018/0339709 | A1 | 11/2018 | Tiwari et al. |
| 2019/0049967 | A1 | 2/2019 | Lim et al. |
| 2019/0049980 | A1 | 2/2019 | Chen et al. |
| 2019/0065933 | A1 | 2/2019 | Bogdoll et al. |
| 2019/0072960 | A1 | 3/2019 | Lin et al. |
| 2019/0079659 | A1 | 3/2019 | Adenwala et al. |
| 2019/0369627 | A1 | 12/2019 | Green et al. |

FOREIGN PATENT DOCUMENTS

| | | | | |
|---|---|---|---|---|
| JP | 2004249812 A | | 9/2004 | |
| KR | 20170057084 A | | 5/2017 | |
| WO | WO-2012034784 A1 | * | 3/2012 | ........... B60R 25/246 |
| WO | 2017157863 A1 | | 9/2017 | |
| WO | WO2018084324 A1 | | 5/2018 | |
| WO | WO2018139993 A1 | | 8/2018 | |
| WO | 2019229729 A1 | | 12/2019 | |

OTHER PUBLICATIONS

International Search Report and Written Opinion issued in corresponding International Application No. PCT/IB2019/054596, dated Sep. 18, 2019, pp. 1-10, Canadian Intellectual Property Office, Quebec, Canada.
Office Action dated Feb. 3, 2022 for corresponding case No. KR 10-2020-7037425. (pp. 1-8) English translation of Office Action attached. (pp. 9-26).
Nie et al., Linzhen, "Longitudinal speed control of autonomous vehicle based on a self-adaptive PID of radial basis function neural network," IET Intelligent Transport Systems, vol. 12, No. 6, Mar. 20, 2018, pp. 485-494.
Fritz, H., "Neural speed control for autonomous road vehicles," Control Engineering Practice, vol. 4, No. 4, Apr. 1, 1996, pp. 507-512.
Nguyen et al., Derrick H., "Neural Networks for self-learning control systems," IEEE Control Systems Magazine, vol. 10, No. 3, Apr. 1, 1990, pp. 18-23.
European Search Report issued in corresponding European Application No. 19811531.3, dated Jan. 14, 2022, pp. 1-9, European Patent Office, Munich, Germany.
Canadian Examination Search Report issued in corresponding Canadian Application No. 3,101,436, dated Jul. 27, 2022, pp. 1-3, Canadian Intellectual Property Office, Quebec, Canada.

* cited by examiner

SELF LEARNING VEHICLE CONTROL SYSTEM

PRIORITY CLAIM AND CROSS-REFERENCE

The present application makes reference to, claims priority to, and claims the benefit of U.S. Provisional Patent Application Ser. No. 62/679,475, filed on Jun. 1, 2018, which is also incorporated herein by reference in its entirety.

BACKGROUND

Control strategies often require large amounts of tuning and in-field testing to drive a vehicle at an acceptable performance. Field tuning requires highly skilled control engineers to tune the vehicle's propulsion and braking control systems to drive the vehicle while consistently respecting predetermined safety and performance constraints including accurate stopping at each destination.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
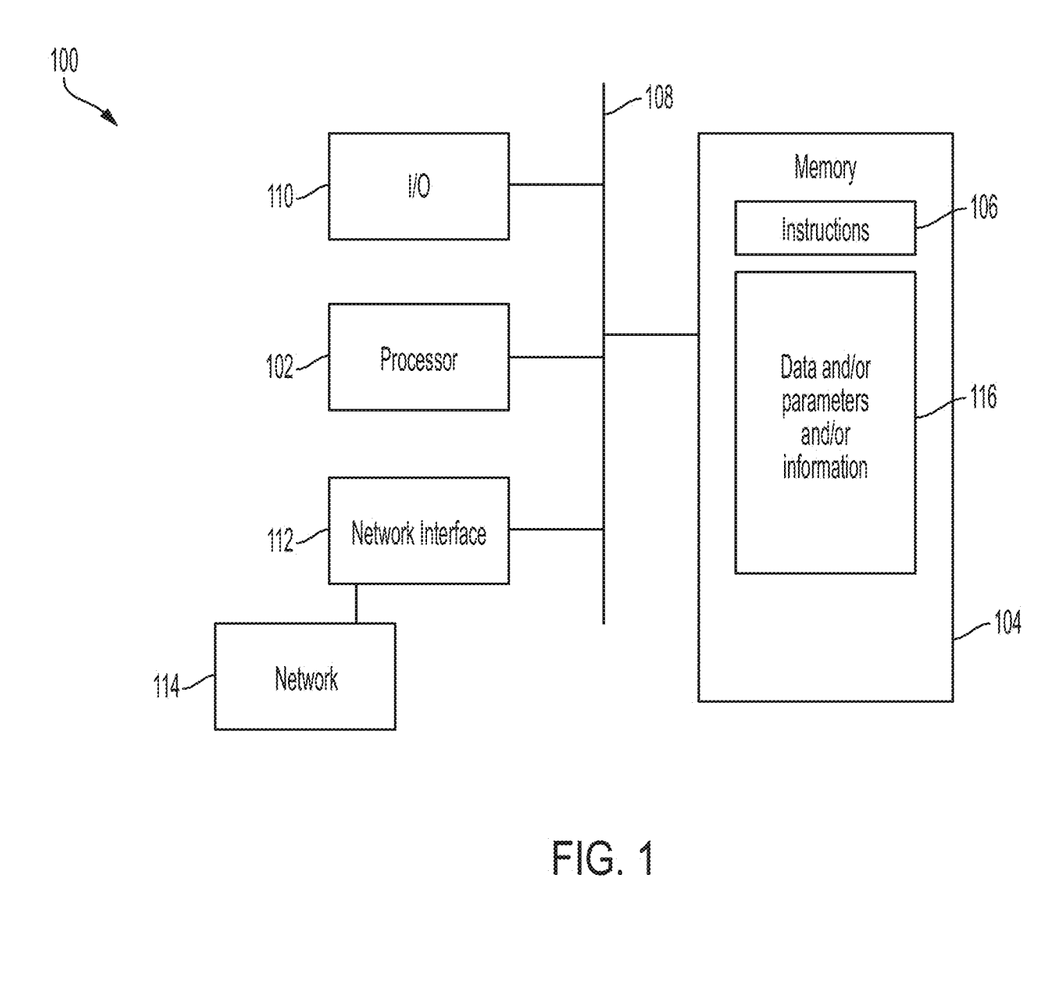
FIG. 1 is a block diagram of a general purpose computing device for implementing a system and/or method, in accordance with some embodiments.

FIG. 1 is a schematic view of a system 100 for executing a self-learning vehicle control system in accordance with one or more embodiments. System 100 includes a hardware processor 102 and a non-transitory, computer readable storage medium 104 encoded with, i.e., storing, the computer program code 106, i.e., a set of executable instructions. The processor 102 is electrically coupled to the computer readable storage medium 104 via a bus 108. The processor 102 is also electrically coupled to an I/O interface 110 by bus 108. A network interface 112 is also electrically connected to the processor 102 via bus 108. Network interface 112 is connected to a network 114, so that processor 102 and computer readable storage medium 104 are capable of connecting to external elements via network 114. The processor 102 is configured to execute the computer program code 106 encoded in the computer readable storage medium 104 in order to cause system 100 to be usable for performing a portion or all of the operations as described.

In some embodiments, the processor 102 is a central processing unit (CPU), a multi-processor, a distributed processing system, an application specific integrated circuit (ASIC), and/or a suitable processing unit.

In some embodiments, the computer readable storage medium 104 is an electronic, magnetic, optical, electromagnetic, infrared, and/or a semiconductor system (or apparatus or device). For example, the computer readable storage medium 104 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 104 includes a compact disk-read only memory (CD-ROM), a compact disk-read/write (CD-R/W), and/or a digital video disc (DVD).

In some embodiments, the storage medium 104 stores the computer program code 106 configured to cause system 100 to perform a method. In some embodiments, the storage medium 104 also stores information needed for performing the method as well as information generated during performing the method, such as data and/or parameters and/or information 116 and/or a set of executable instructions 106 to perform the operation of the method.

System 100 includes I/O interface 110. I/O interface 110 is coupled to external circuitry. In some embodiments, I/O interface 110 includes a keyboard, keypad, mouse, trackball, trackpad, and/or cursor direction keys for communicating information and commands to processor 102.

System 100 also includes network interface 112 coupled to the processor 102. Network interface 112 allows system 100 to communicate with network 114, to which one or more other computer systems are connected. Network interface 112 includes wireless network interfaces such as BLUETOOTH, WIFI, WIMAX, GPRS, or WCDMA; or wired network interface such as ETHERNET, USB, or IEEE-1394. In some embodiments, the method is implemented in two or more systems 100, and information is exchanged between different systems 100 via network 114.

System 100 is configured to receive information through I/O interface 110. The information is transferred to processor 102 via bus 108.

In at least some embodiments, program code 106 comprises one or more neural networks. A neural network, or artificial neural network (ANN), includes one or more computing platforms performing machine learning to solve problems in a manner similar to a biological brain, e.g., a human brain. To do so, the neural network includes a plurality of nodes, or artificial neurons, connected together to simulate neurons in a biological brain. Nodes of a neural network are arranged in layers. A signal travels from an input layer through multiple layers of the neural network to an output layer. As the signal travels through the neural network, the signal is modified by weights of the nodes and/or weights of connections among the nodes. The weights are adjusted as learning or training proceeds in the neural network. Examples of neural networks include, but are not limited to, recurrent neural network, multilayer perceptron, convolutional neural network and similar.

In at least one embodiment, the ANN is a recurrent neural network trained based on a sequence of states of the vehicle. In at least one embodiment, the training of the neural network is not based on an immediate measured state of the vehicle. For example, as described herein, the training of the vehicle module is directed at a sequence of accelerations. In at least some embodiments, the sequence of accelerations includes historical sequences of accelerations over a given time period. In at least some embodiments, the training of the vehicle module neural network includes training for velocity in addition to acceleration. For example, in accordance with the description herein, the training of the vehicle module is directed at a sequence of velocities. In at least some embodiments, the sequence of velocities includes historical sequences of velocities over a given time period.

In at least one embodiment, the training of the neural networks is based on an overdetermination test in order to minimize the data input required to test and validate the vehicle module. This approach is in contrast to other approaches using arbitrary historic data.

An embodiment of the self learning vehicle control system is usable in conjunction with a rail vehicle operating on a guideway. The self learning vehicle control system is usable in conjunction with vehicles other than rail vehicles, e.g., automotive vehicles, watercraft, aerospace vehicles, rovers or drones or the like.

In at least one embodiment, the self learning process is performed automatically without manual tuning by field application engineers and without disruption to revenue service. In the given embodiment, the self learning process operates in a "shadow" mode of operation while the vehicle is manually operated by the driver or by another control system in an automatic train operation (ATO), driverless, or unattended mode of operation.

The self learning process may be performed in 2 stages. In one stage, a vehicle model is characterized based on a vehicle operated on the guideway in real time. In another stage, a speed controller is built, either on-line or off-line, based on the vehicle model developed in the other stage in order to prepare the speed controller for in the field application. The foregoing self learning process is much faster, lower cost, more efficient, and adherent to trip constraints than other processes which require manual tuning of the speed controller and significant software development on a vehicle-by-vehicle basis.

One or more embodiments involve an on-board computer, such as system 100 having one or more interfaces, such as I/O interface 110, to connect with position, speed, acceleration, and angular speed measurement sensors, along with two neural networks. As described, the neural networks are executed as part of program code 106. In some embodiments, the neural networks are separate from system 100. According to an embodiment, one neural network (a vehicle model neural network) learns to model the vehicle's dynamic behavior and the other neural network (an automatic speed control neural network) teaches itself to drive the vehicle with propulsion and braking control commands while respecting user's or system predefined constraints. In at least one embodiment, the vehicle includes a single neural network as part of the on-board computer during a training phase. In such an embodiment, the single neural network is a vehicle model neural network described below.

In at least one embodiment, a communication based train control (CBTC) system is able to operate in ATO, driverless or unattended modes of operation where the on-board computer, e.g., processor 102, commands the requested propulsion and braking effort, along with coasting, to the vehicle's control systems. An embodiment of the program code 106 of the self learning vehicle control system comprises at least two modules: a vehicle model and an automatic speed controller. In at least one embodiment, the two modules each comprise a neural network, a vehicle model neural network and an automatic speed control neural network.

With respect to the vehicle model neural network module (also referred to as a vehicle module), the vehicle module characterizes the vehicle in terms of its kinematic properties (including, but not limited to, speed, acceleration, and angular speed in three dimensions (3D)) in response to vehicle control commands. Vehicle control commands include propulsion effort, braking effort, and coasting instructions input by a driver of the vehicle or a control system controlling the vehicle. The vehicle characterization is performed in consideration of the vehicle's geographic location on the guideway (including, but not limited to, grade, curvature, and superelevation) to determine the vehicle control loop properties. Vehicle control loop properties include, but are not limited to, response time, lag, frequency, and amplitude response to various control commands such as step commands in both steady-state and non-steady-state behavior. The vehicle module is executed while the vehicle is operated on the actual guideway controlled by the driver or by a control system. In at least one embodiment, the vehicle module takes into consideration environment factors impacting the vehicle kinematics, e.g., grade, curvature, and elevation.

During characterization, the self learning system requests a predefined speed profile for the vehicle which the driver or control system is expected to follow by input of commands to the vehicle. In at least some embodiments, the predefined speed profile comprises speed, acceleration, and braking parameters. The self learning system then monitors the propulsion, braking, or other input commands along with vehicle status attributes. The vehicle status attributes include the vehicle location on the guideway and the vehicle speed, acceleration, and angular velocity. The monitoring is performed in real time while the vehicle is controlled by the driver or the control system. Each of the monitored vehicle status attributes is sampled at a predefined sampling rate. In some embodiments, the predefined sampling rate is twice the input rate required by the vehicle control systems. In some embodiments, the predefined sampling rate is four times the input rate required by the vehicle control systems. In some embodiments, the predefined sampling rate is greater or lesser than twice the input rate required by the vehicle control systems. A larger predefined sampling rate incurs greater bandwidth, storage, and processing costs at the benefit of a higher theoretical modeling accuracy. A smaller predefined sampling rate incurs fewer bandwidth, storage, and processing costs.

In some embodiments, the vehicle control systems includes the vehicle propulsion and braking control systems. In some embodiments, the vehicle control systems includes the vehicle propulsion, steering, and braking control systems. In some embodiments, further control systems are included in the vehicle control systems.

In at least some embodiments, the monitored vehicle input commands, e.g., propulsion and braking effort commands, cover the entire dynamic range of the vehicle control in terms of speed range, acceleration/deceleration range, step (having various magnitudes and durations) commands, linear gradual commands having various slopes and durations and similar. The entire dynamic range is requested, in the form of the requested predefined speed profile to enable the self learning system to cover the dynamic range of the vehicle control.

At least one intent of covering the dynamic range of the vehicle control is to enable the self learning system to learn vehicle behavior in as many driving scenarios as possible while using the least amount of guideway time possible. In this manner, the risk of poor driving control when driving at non-standard extremes is mitigated. The requested predefined driving profile from the system is optimized to actuate as much of the model dynamics as possible while using the least amount of guideway driving time. In some embodiments, the requested predefined driving profile causes a driver or controller to execute a majority (i.e., 50% or more) of a range of at least one of the vehicle control commands. For example, a predefined driving profile requests an actual propulsion effort command to drive the vehicle at different propulsion levels covering more than 50% of the possible propulsion levels of the vehicle. In at least one embodiment, the requested predefined driving profile causes a driver or controller to execute at least 75% of a range of at least one of the vehicle control commands. In some embodiments, the predefined driving profile reduces the number of switches from motoring to braking to also reduce a strain in drive relays on the vehicle. An ANN algorithm is used to process the commands issued by the driver or the control system in view of the predefined speed profile requested by the self learning system to monitor the measured vehicle status, e.g., 3D speed, 3D acceleration, and 3D angular velocity. The ANN algorithm, through the application of training techniques, determines the vehicle response properties with the goal of generating a model of the real vehicle, i.e., the vehicle model neural network. In at least some embodiments, the model is an optimal model or the real vehicle as a result of applying optimal training techniques to the ANN algorithm. The vehicle model is considered trained when the fit error on an independent validation dataset is less than a predefined tolerance. In effect, the error between predicted and real acceleration is within tolerance for the acceleration profile, in at least some embodiments.

In at least one embodiment, the vehicle module includes the capability to receive inputs corresponding to one or more of actual propulsion effort commands, actual braking effort commands, a requested speed, a change in the requested speed (including magnitude, and increase or decrease thereof), a requested acceleration/deceleration, a change in the requested acceleration (including magnitude, and increase or decrease thereof), a measured vehicle location, a measured vehicle speed, a measured vehicle acceleration, and a measured vehicle angular speed.

The vehicle being operated on the guideway by a driver or a control system includes one or more of position (location) sensor(s), speed sensor(s), acceleration sensor(s), angular speed sensor(s), and a display. In some embodiments, additional sensors are employed depending on the vehicle capabilities. In some embodiments, the position (location) sensor(s) include, but are not limited to, a GPS receiver, camera, ultra wide band (UWB) sensor, radar, LIDAR, and/or thermal camera. In some embodiments, the speed sensor(s) include, but are not limited to, a GPS receiver, camera, ultra wide band (UWB) sensor, radar, LIDAR, and/or thermal camera. In some embodiments, the acceleration sensor(s) include, but are not limited to, an inertial measurement unit (IMU). In some embodiments, the angular speed sensor(s) include, but are not limited to, an IMU. In some embodiments, the display is used to display the requested speed and acceleration commands. In some embodiments, the display is used to display steering commands.

Figure 2:
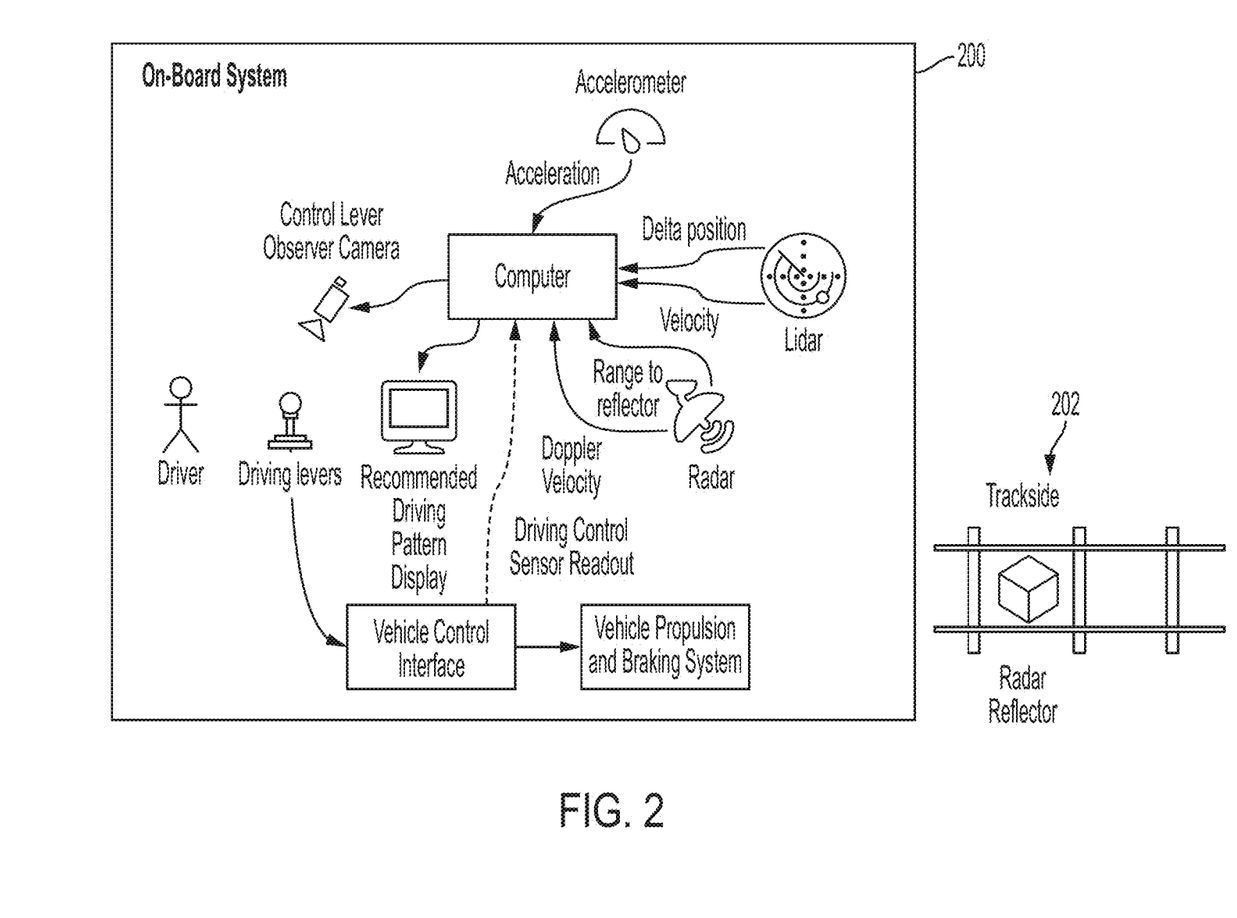
FIG. 2 is a block diagram of a vehicle used in a training phase, in accordance with some embodiments.

FIG. 2 is a block diagram of a vehicle used in a training phase, in accordance with an embodiment. FIG. 2 depicts a vehicle 200 and a guideway 202 along which the vehicle will travel and be commanded. Vehicle 200 includes an on-board computer, e.g., system 100, along with several sensors, e.g., an accelerometer, LIDAR, radar, and a camera, a display, and the vehicle control interface. The driver operates the vehicle 200 using one or more driving levers which are part of the vehicle control interface. In at least some embodiments, the camera monitors the position of the driving levers in order to capture the driver input commands, e.g., propulsion and/or braking commands. In at least some embodiments, the driving levers supply the information directly to the computer without the need for the camera. The guideway 202 includes a radar retroreflector for redirecting a radar signal from the radar to the vehicle. In some embodiments, the guideway 202 does not include the radar retroreflector. The display displays the predefined speed profile to the driver.

With respect to the automatic speed control neural network (also referred to as a speed control module), the speed control module defines a speed control law to drive the vehicle via the vehicle commands, e.g., propulsion and/or braking commands, subject to further operational constraints related to the required vehicle operation. In at least some embodiments, the speed control module defines an optimal speed control law for driving the vehicle.

In some embodiments, the further operational constraints include, but are not limited to, minimal platform-to-platform travel time, minimal line (start-to-end) travel time, energy consumed (platform-to-platform) is no greater than a specific energy threshold, energy consumed (start-to-end) is no greater than a specific energy threshold, final platform alignment displacement error, minimal relay switching between motoring and braking modes, minimal passenger discomfort from the driving strategy, and other similar constraints. The speed control module is executed on the ANN in simulation based on an already established vehicle module. In this manner, because the vehicle module is already established cost is lowered due to the reduced or eliminated need to employ expensive real guideway time for training of the speed control module.

By applying training techniques, the ANN algorithm for the speed control module determines the vehicle commands, e.g., propulsion and/or braking commands, while the operational constraints are met. In some embodiments, different operational constraints are applied depending on the particular system operational environment and configuration.

For example, in some embodiments, minimum platform-to-platform travel time while respecting energy thresholds from a first threshold to a second threshold in energy threshold steps is applied in some embodiments. That is, particular constraints and/or combination of constraints are applied to the speed control module in order to teach the speed control module to handle particular scenarios.

After the speed control module is trained, the self learning vehicle control system is ready for operational deployment on a vehicle on a guideway. In some embodiments, the training for the speed control module is able to be executed in parallel with the training for the vehicle module, thus allowing for fast training and fast deployment. According to at least some embodiments, a full optimal ANN automatic speed controller is developed prior to the driver or control system has completed the requested speed profile. The speed controller is considered trained when it successfully completes a portfolio of validation scenarios to within a set tolerance (e.g., no overspeed and jerk, acceleration, braking, arrival time, energy usage and stopping errors are within predefined tolerances).

In at least one embodiment, the speed control module includes a simulator capable of simulating position (location), speed, acceleration, and angular speed of the vehicle. In at least one embodiment, the speed control module includes an interface for receiving the operational constraints, e.g., reading of constraints in the form of rules from a file or database. In at least one embodiment, the speed control module includes an interface for receiving drive criteria definitions. Drive criteria include constraints which define the limits on the control system's behavior (e.g., speed, jerk, acceleration, braking, arrival time, energy usage and stopping error limits).

Figure 3:
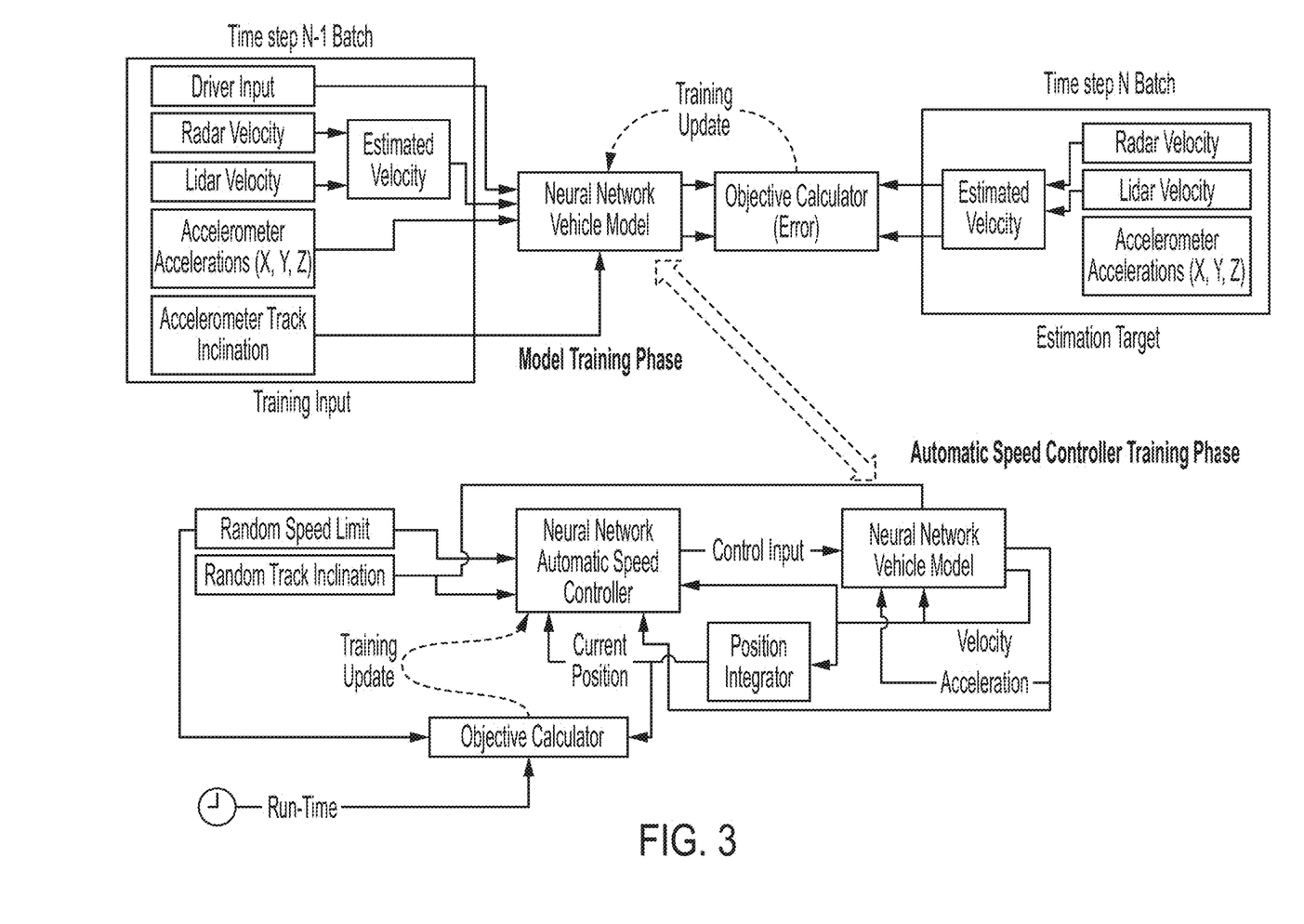
FIG. 3 is a block diagram of a self learning vehicle control system, in accordance with some embodiments.

FIG. 3 is a block diagram of a self learning vehicle control system, in accordance with some embodiments. As depicted in FIG. 3, the upper portion of the diagram includes the vehicle module training phase for teaching the vehicle module the kinematics and operational profile of the vehicle. The vehicle module training phase includes operation of the vehicle on a guideway by a driver or control system responsive to a predefined speed profile. Information including driver commands and vehicle status is captured by sensors connected to the vehicle is supplied to the vehicle module, i.e., the neural network vehicle model, and an objective calculator determines a difference between the actual velocity and the estimated velocity of the module and feeds back training update information to update the vehicle module and improve the accuracy.

After the vehicle module is trained, the vehicle module is used in connection with the training of the speed control module in the lower portion of the diagram. Due to the use of the vehicle module, the speed control module is able to be trained on multiple varying scenarios without the need to drive a vehicle on a real guideway. The speed control module generates one or more vehicle control commands in response to receipt of one or more of a speed profile for the vehicle, a guideway attribute (e.g., a guideway inclination value), or a vehicle status attribute (e.g., one or more of a vehicle velocity, vehicle acceleration, or vehicle position). The vehicle module receives the generated one or more vehicle control commands and updates one or more of the vehicle velocity, vehicle acceleration, or vehicle position based on the learned vehicle kinematics as captured in the vehicle module. During execution, an objective calculator provides updates to train the speed control module based on the speed profile and the vehicle status attribute, e.g., vehicle position.

In at least some embodiments, there are several phases to operation of the self learning system.

Figure 4:
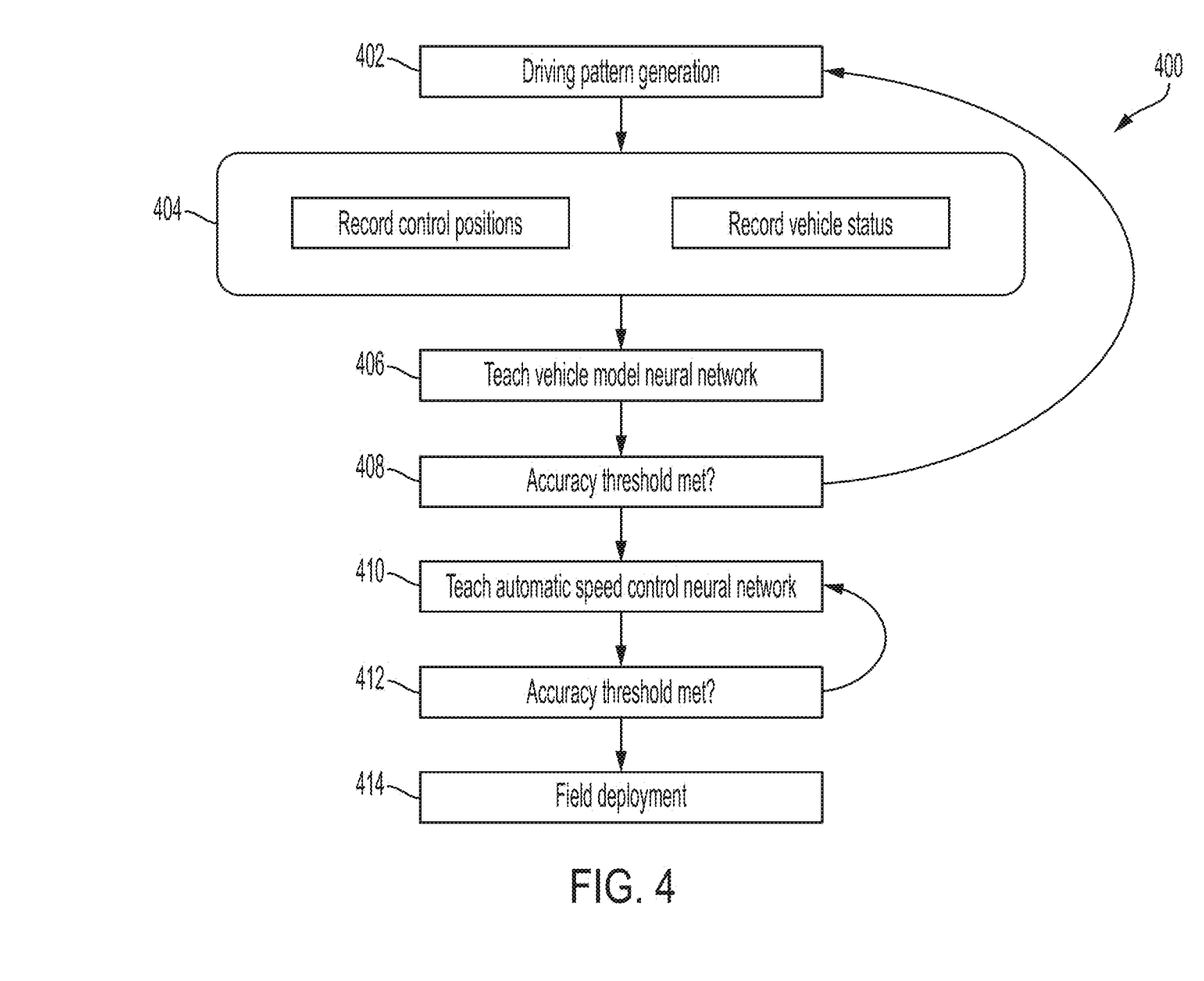
FIG. 4 is a flow chart of a method of operating a self learning vehicle control system, in accordance with some embodiments.

FIG. 4 is a flow chart of a method 400 of operating a self learning vehicle control system. In some embodiments, method 400 is performed by an on-board computer, e.g., system 100. In some embodiments, additional steps may be performed before, during, or after the steps depicted. In some embodiments, the steps may be performed in a different order to accomplish the same function.

Method 400 includes a step 402 in which the system generates driving patterns, e.g., predefined speed profile, for the driver or control system to follow. The profile is optimized to use a wide range of the vehicle capabilities in terms of propulsion, coasting, and/or braking efforts. The profile includes commands as described above including step (of various magnitudes and durations), linear change (of various slopes and durations), commands to characterize the vehicle dynamic response (time, lag, frequency, and amplitude) over the operating envelope of the vehicle and its possible driving/control states.

The flow proceeds to step 404 in which the system records the vehicle control positions and/or the vehicle input commands and records the vehicle status. As the driver or control system follows the predefined speed profile requested by the system while respecting safety constraints, a sensor (such as but not limited to a camera) records the position of the control levers set by the driver or control system. In an embodiment in which the driver lever position is difficult or impractical to capture through computer imaging, a direct hardware interface is used to read the control lever position(s). In at least some embodiments, a computer vision algorithm is used to decode the control lever position to determine the propulsion and/or braking effort commands sent to the vehicle control system. In an embodiment in which the vehicle is controlled by a control system, the driver lever position is recorded through the commands sent to the vehicle control systems by the control system.

The flow proceeds to step 406 in which the vehicle module is trained based on the input commands and vehicle status. In some embodiments, a speed sensor, such as but not limited to radar or LIDAR, records the speed of the vehicle and the range to retroreflecting elements along the track at defined intervals. As depicted in FIG. 2, the retro-reflectors are mounted in the middle of the track and are small enough to allow the vehicle to pass over. In some embodiments, the retro-reflectors are arranged to display as large radar cross-section targets on a radar. In some embodiments, an IMU detects acceleration and angular speed observed due to the propulsion and/or braking efforts commanded by the driver or control system. In some embodiments, the IMU is mounted near the bogies on multiple portions of the vehicle in order to more accurately capture cross-vehicle forces and complex track grades. The readings from the sensors are sensor-fused to determine the 3D heading of the vehicle, in at least one embodiment. The sensor readings are synchronized and recorded with a timestamp.

The captured sensor data and input commands having been fed in training to the vehicle module ANN, the vehicle module learns the vehicle's dynamic model which maps propulsion and/or braking efforts to control commands with the vehicle response characteristics such as 3D acceleration, 3D speed, and/or 3D displacement. The self learning vehicle control system records the commands which result in the propulsion and/or braking efforts and the measured speed, acceleration, and angular speed as inputs and the speed, acceleration, and angular speed in the next cycle (next time-step) as a training target. Backpropagation is used to train the self learning vehicle control system, and in particular, the vehicle module, to minimize the objective and resultantly capture the vehicle's dynamic model along with the entire delay, frequency response, cross-car forces and disturbance models available.

As the driver or control system continues to follow the predefined speed profile, the vehicle module ANN improves its knowledge characterizing the vehicle's dynamics more precisely through on-line training. On-line training is intended to cover instances in which the vehicle is operating in the real world along a guideway. Off-line training is intended to cover instances in which a simulation of the vehicle and/or components are executed to move a simulated vehicle along a simulated guideway.

In some embodiments, the vehicle module is repeatedly tested in real-time to predict the response to requested driving commands, e.g., in the form of the predefined speed profile, while training.

The flow proceeds to step 408 in which the vehicle module performance is tested against real world information to determine whether the vehicle module achieves an expected accuracy threshold. The vehicle module is considered trained when the fit error on an independent validation dataset is less than a predefined tolerance. In effect, the error between predicted and real acceleration is within tolerance for the speed/acceleration profile, in at least some embodiments. If the accuracy threshold is not met, the flow returns to step 402 for additional training of the vehicle module.

After the vehicle module meets or exceeds the accuracy threshold, the vehicle module ANN stops learning and the speed control module starts learning how to control the vehicle in step 410. In simulation, the speed control module drives the vehicle in the form of interacting, e.g., issuing control commands to the simulated vehicle, with the vehicle module. In some embodiments, the speed control module is executed through multiple randomized training scenarios for controlling the vehicle. In some embodiments, the speed control module is executed through millions of training scenarios. In some embodiments, the execution of the speed control module through training scenarios is performed in parallel, i.e., multiple training scenarios are executed in parallel.

In at least some embodiments, the speed control module is executed through scenarios having training objectives including, but not limited to, minimum driving time, minimum overspeed, minimum passenger discomfort, minimum stop overshoot, minimum energy, minimum switching from motoring to braking, and/or other similar objectives. Passenger discomfort can be quantified as high jerk motions, high motoring/braking effort or any oscillatory driving behavior (e.g. large amount of cycling from motoring to braking and vice versa). Passenger discomfort is caused by one or more of a longitudinal jerk, longitudinal acceleration, lateral acceleration, and/or vertical acceleration, in at least one embodiment. The passenger discomfort is possible in a positive or negative motion, e.g., forward or reverse acceleration. In at least one embodiment, a maximum longitudinal jerk value is 1 meter/second$^3$. In at least one embodiment, a maximum discomfort in a direction of acceleration is ½ gravity. The training objectives are limited by constraints including, but not limited to, minimum and/or maximum speed limits, minimum and/or maximum arrival time limits, and/or minimum and/or maximum jerk limits.

The flow proceeds to step 412 in which the speed control module performance is tested against real world information to determine whether the vehicle module achieves an expected accuracy threshold. The speed control module is considered trained when the fit error on an independent validation dataset is less than a predefined tolerance. In effect, the error between predicted and real acceleration is within tolerance for the speed/acceleration profile, in at least some embodiments. If the accuracy threshold is not met, the flow returns to step 410 for additional training of the vehicle module.

The flow proceeds to step 414 in which the speed control module is deployed to a vehicle. The speed control module is activated and generates control commands to the vehicle control systems. In at least some embodiments, the control commands are presented to a driver of the vehicle. The control commands include propulsion, braking, and/or coasting commands to bring the vehicle to the next station while minimizing the objectives described above. During execution of the commands by the vehicle, the actual position of the vehicle on the guideway is fed back to the speed control module from sensors including, but not limited to, GPS, LIDAR, and/or radar. In at least some embodiments, retro-reflecting elements installed on the guideway are used to provide position of the vehicle. In some embodiments using retro-reflecting elements, the range measured to the retro-reflecting elements at the platform stopping locations provides a metric by which to assess the stopping accuracy achieved by the speed control module.

Successful completion of transiting to a next station subject to constraints, such as those described above, and performance with respect to the objectives, such as those described above, results in a determination that the speed control module can be deployed to a system in the field.

After deployment in the field and integration of vehicle control and sensor interfaces with the speed control module, the speed control module is able to train itself in real time to adapt to the changing real life vehicle model when the vehicle performance begins to deteriorate over its lifespan. For example, as the braking system degrades due to normal wear and tear and stopping distances increase, the speed control module is able to learn the new vehicle performance parameters and adjust the vehicle control commands issued to the driver and/or control system.

In some embodiments, a guideway is a track, rail, roadway, cable, series of reflectors, series of signs, a visible or invisible path, a projected path, a laser-guided path, a global positioning system (GPS)—directed path, an object-studded path or other suitable format of guide, path, track, road or the like on which, over which, below which, beside which, or along which a vehicle is caused to travel.

As stated above, monitoring of the vehicle status by the self learning system includes monitoring the speed, acceleration, and angular velocity of the vehicle in three dimensions, i.e., 3D speed, 3D acceleration, and 3D angular velocity.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A self-learning vehicle control system, the control system comprising:
 a processor executing a first neural network and a second neural network and the first neural network is a vehicle model neural network, wherein the vehicle model neural network is a recurrent neural network, and the second neural network is a speed control neural network, and the processor is configured to receive one or more of the following inputs:
  one or more vehicle control commands; and
  one or more vehicle status attributes, the one or more vehicle status attributes comprising one or more sequences of states of a vehicle;
 one or more vehicle status sensors communicably connected with the processor; and
 an output device communicably connected with the processor and for providing a requested speed profile; and
 wherein the speed control neural network is configured to generate the one or more vehicle control commands in response to receipt of the one or more vehicle status attributes, the requested speed profile, or a guideway attribute and the vehicle model neural network is configured to receive the one or more vehicle control commands and generate updated vehicle status attributes, and the speed control neural network is configured to receive the generated updated vehicle status attributes.

2. The self-learning vehicle control system of claim 1, wherein the one or more vehicle control commands comprise one or more of:
 a propulsion effort command;
 a braking effort command;
 a steering effort command;
 a requested speed command;
 a change in a requested speed command;
 a requested acceleration command;
 a change in a requested acceleration command;
 a requested steering command; or
 a change in a requested steering command.

3. The self-learning vehicle control system of claim 1, wherein the one or more vehicle status attributes comprise one or more of:
 a measured vehicle location;
 a measured vehicle speed;
 a measured vehicle acceleration; or
 a measured vehicle angular speed.

4. The self-learning vehicle control system of claim 1, wherein the one or more vehicle status attributes is sampled at a predefined sampling rate of two times the input rate of the vehicle control system.

5. The self-learning vehicle control system of claim 1, wherein the one or more vehicle status sensors comprises one or more of:
 one or more speed determination sensors communicably connected with the processor;
 one or more acceleration determination sensors communicably connected with the processor; or
 one or more angular speed determination sensors communicably connected with the processor.

6. The self-learning vehicle control system of claim 1, wherein the vehicle model neural network is configured to determine one or more vehicle control loop properties based on the one or more vehicle control commands and the one or more vehicle status attributes.

7. The self-learning vehicle control system of claim 6, wherein the vehicle control loop properties include one or more of a vehicle response time, a vehicle lag, a vehicle frequency, or a vehicle amplitude response with respect to the one or more vehicle control commands.

8. The self-learning vehicle control system of claim 1, wherein the requested speed profile requests vehicle control command inputs, where the vehicle control command inputs include at least 50% of possible vehicle control command inputs.

9. The self-learning vehicle control system of claim 1, wherein the requested speed profile requests vehicle control command inputs, where the vehicle control command inputs include at least 75% of possible vehicle control command inputs.

10. The self-learning vehicle control system of claim 1, wherein the one or more vehicle control commands are captured by a camera configured to monitor the position of driving controls of the vehicle.

11. The self-learning vehicle control system of claim 1, wherein the requested speed profile includes step and linear change commands to characterize the vehicle dynamic response over an operating envelope of the vehicle.

12. The self-learning vehicle control system of claim 1, wherein the one or more sequences of states comprise at least one of a sequence of velocities or a sequence of accelerations.

13. The self-learning vehicle control system of claim 1, wherein the one or more vehicle status sensors includes capture of vehicle kinematic data including one or more of grade, curvature, and elevation.

14. An automatic speed control system, the speed control system comprising:
 a processor configured to execute a set of instructions stored on a non-transitory computer readable media, the instructions comprising:
  a vehicle module wherein the vehicle module is a neural network; and
  a speed control module wherein the speed control module is a neural network, the speed control module communicably coupled with the vehicle module;
  one or more vehicle status sensors communicably connected with the processor;
 wherein the speed control module is configured to, via the instructions, generate vehicle control commands in response to receipt of one or more vehicle status attributes, a speed profile, or a guideway attribute and the vehicle module is configured to receive the vehicle control commands and generate updated vehicle status attributes, the speed control module is configured to receive the generated updated vehicle status attributes.

15. The automatic speed control system of claim 14, wherein the vehicle module is trained when the fit error on an independent validation dataset is less than a predefined tolerance.

16. The automatic speed control system of claim 14, wherein the speed control module is trained when the speed control module completes a portfolio of validation scenarios to within a set tolerance.

17. The automatic speed control system of claim 14, wherein the speed control module is configured to meet one or more training objectives.

18. The automatic speed control system of claim 17, wherein the one or more training objectives comprise one or more of:
 minimum driving time;
 minimum overspeed;
 minimum passenger discomfort;
 minimum stop overshoot;

minimum energy; or minimum switching from motoring to braking.

19. The automatic speed control system of claim 14, wherein the speed control module is limited by one or more constraints.

20. The automatic speed control system of claim 19, wherein the one or more constraints comprise one or more of:
- a minimum speed limit;
- a maximum speed limit;
- a minimum arrival time limit;
- a maximum arrival time limit;
- a minimum jerk limit;
- a maximum jerk limit, a maximum acceleration limit; a minimum acceleration limit; a maximum deceleration limit; or a minimum deceleration limit.

\* \* \* \* \*